US005723276A

United States Patent [19]

Shaw-Klein et al.

[11] Patent Number: 5,723,276

[45] Date of Patent: Mar. 3, 1998

[54] COATING COMPOSITIONS FOR PHOTOGRAPHIC PAPER

[75] Inventors: Lori Jeanne Shaw-Klein, Rochester; Charles Chester Anderson; Yongcai Wang, both of Penfield, all of N.Y.

[73] Assignee: Eastman Kodak Company, Rochester, N.Y.

[21] Appl. No.: 712,019

[22] Filed: Sep. 11, 1996

[51] Int. Cl.[6] .............................. G03C 1/89; B32B 23/08; B32B 27/08; B32B 27/30

[52] U.S. Cl. .......................... 430/528; 430/215; 430/527; 430/529; 430/961; 430/263; 428/511; 428/516; 428/520; 428/522

[58] Field of Search .................................... 430/527, 529, 430/528, 627, 215, 961, 263; 428/511, 516, 520, 522

[56] References Cited

U.S. PATENT DOCUMENTS

| | | | |
|---|---|---|---|
| 3,525,621 | 8/1970 | Miller et al. | 430/527 |
| 3,895,949 | 7/1975 | Akamatsu et al. | 430/273 |
| 4,497,917 | 2/1985 | Upson et al. | 523/201 |
| 4,705,746 | 11/1987 | Tamagawa et al. | 430/538 |
| 4,954,559 | 9/1990 | Den Hartog et al. | 524/507 |
| 5,008,621 | 4/1991 | Van Thillo et al. | 430/527 |
| 5,075,164 | 12/1991 | Bowman et al. | 430/527 |
| 5,156,707 | 10/1992 | Kato et al. | 430/536 |
| 5,166,254 | 11/1992 | Nickle et al. | 524/512 |
| 5,204,404 | 4/1993 | Werner et al. | 524/501 |
| 5,219,916 | 6/1993 | Den Hartog et al. | 524/518 |
| 5,244,728 | 9/1993 | Bowman et al. | 430/529 |
| 5,314,945 | 5/1994 | Nickle et al. | 524/507 |
| 5,447,832 | 9/1995 | Wang et al. | 431/527 |

OTHER PUBLICATIONS

Journal of Applied Polymer Science, vol. 39, pp. 2119–2128 (1990).

*Primary Examiner*—Richard L. Schilling
*Attorney, Agent, or Firm*—Carl F. Ruoff

[57] ABSTRACT

The present invention is a polyolefin resin coated paper base having a backing layer. The backing layer is formed by coating and subsequent drying of a coating composition having dispersed therein colloidal inorganic oxide particles, an antistatic agent and a film forming binder. The film forming binder is a carboxylic acid containing vinyl polymer or copolymer having a glass transition temperature greater than 25° C. and an acid number of from 30 to 260 wherein the carboxylic acid containing vinyl polymer or copolymer is reacted with ammonia or amine so that the coating composition has a pH of from 7 to 10.

20 Claims, No Drawings

COATING COMPOSITIONS FOR PHOTOGRAPHIC PAPER

CROSS REFERENCE TO RELATED APPLICATIONS

This application relates to commonly assigned copending application Ser. No. 07/712,006, Express Mail No. TB440987360 which is filed simultaneously herewith and hereby incorporated by reference for all that it discloses.

This application relates to commonly assigned copending application Ser. No. 08/712,018, Express Mail No. TB440987349 which is filed simultaneously herewith and hereby incorporated by reference for all that it discloses.

This application relates to commonly assigned copending application Ser. No. 08/712,010, Express Mail No. TB44098735X which is filed simultaneously herewith and hereby incorporated by reference for all that it discloses.

This application relates to commonly assigned copending application Ser. No. 08/712,016, Express Mail No. TB440987371 which is filed simultaneously herewith and hereby incorporated by reference for all that it discloses.

This application relates to commonly assigned copending application Ser. No. 08/712,016, Express Mail No. TB440987404 which is filed simultaneously herewith and hereby incorporated by reference for all that it discloses.

FIELD OF THE INVENTION

This invention relates to photographic papers having antistatic layers having abrasion resistant properties and to coating compositions suitable for the preparation thereof. More particularly, this invention relates to polyolefin coated photographic paper supports having on one side thereof a coating of polymer capable of withstanding the abrasive environment typically encountered by such paper, and to coating compositions resulting in such coatings which may be coated from water and adequately dried under relatively mild conditions.

BACKGROUND AND RELATED ART

A common issue in photographic paper handling is abrasion resistance. Because the paper backing contacts many rollers and stationary shoes during sensitizing, processing, and printing operations, a certain amount of dusting may occur, which can compromise image quality. In particularly severe situations, abraded backing material may build up on shoes or rollers. This buildup can indent the resin coated paper, causing visible streaks in the imaged area on the opposite side of the paper.

Buildup of backing material on rollers or stationary shoes can be minimized by avoiding a polymeric binder in the backing material as discussed in U.S. Pat. No. 3,525,621 or U.S. Pat. No. 5,008,178. These patents disclose the use of colloidal silica in photographic paper backings. In U.S. Pat. No. 3,525,621, ionic surfactants are added in order to enhance conductivity, but there is no polymeric binder specified. In U.S. Pat. No. 5,008,178, a backing is disclosed which is comprised solely of colloidal silica of particle size less than 7 nm along with a nonionic surfactant such as saponin. Such backings typically produce loose dust due to their lack of binder material, and show other behaviors which are generally unacceptable for photographic paper backings.

For example, in order to efficiently retain information printed on the back of a photograph by dot matrix, solvent inkjet, or thermal printing, a polymeric material must be added to the backing material formulation. Typical examples of such backings may be found in U.S. Pat. Nos. 5,244,728; 4,705,746; and 5,156,707. In U.S. Pat. No. 4,705,746, binder materials are selected from carboxylated or uncarboxylated styrene-butadiene rubber, methyl methacrylate-butadiene rubber, or styrene-methyl methacrylate-butadiene rubber. In U.S. Pat. No. 5,244,728, binder materials are claimed comprising terpolymers of alkylmethacrylates-vinyl benzene-alkali metal salts of ethylenically unsaturated sulfonic acid. In U.S. Pat. No. 5,156,707, binder materials are claimed comprising styrene-acrylate polymers polymerized in the presence of water soluble polymers selected from the following: polyvinyl alcohol, carborylated PVA, styrene-maleic acid copolymers and salts thereof, polyacrylic acid, polystyrenesulfonic acid, and a water soluble acrylate compound.

An approach for reducing abrasion of paper backings is the introduction of a chemical crosslinker. Such an approach is disclosed in U.S. Pat. No. 5,156,707. In this patent, the backing layer may contain a compound having at least two ethyleneimino groups or gycidylether groups. However, use of such crosslinkers is often limited due to health and environmental issues. In addition, such crosslinkers often require high temperatures in order to react to completion, and such conditions are seldom available during the high speed drying required for optimal manufacturing efficiency.

In coatings intended for photographic paper binders, polymeric binders have typically been limited to those functionalized with a sulfonic acid, such as U.S. Pat. No. 5,244,728, or with carboxylic acids, such as those claimed in U.S. Pat. No. 4,705,746. Often, the polymeric binders are not functionalized at all. Ammonia or amine neutralized polymers have not been previously disclosed as a route to obtain hard abrasion resistant coatings for photographic paper without the need for excessive drying conditions.

Other approaches have been disclosed in photographic imaging art in order to obtain abrasion resistant polymer coatings. While these approaches have not been discussed in detail in the context of coatings for photographic paper backings, they provide useful background information in defining the comparative usefulness of the present invention.

To fully coalesce a polymer latex with a higher Tg requires significant concentrations of coalescing aids. This is undesirable for several reasons. Volatilization of the coalescing aid as the coating dries is not desirable from an environmental standpoint. In addition, subsequent recondensation of the coalescing aid in the cooler areas of the coating machine may cause coating imperfections and conveyance problems. Coalescing aid which remains permanently in the dried coating will plasticize the polymer and adversely affect its resistance to blocking, ferrotyping, and abrasion.

An approach reported to provide aqueous coatings that require little or no coalescing aid is to use core-shell latex polymer particles. A soft (low Tg) shell allows the polymer particle to coalesce and a hard (high Tg) core provides the desirable physical properties. The core-shell polymers are prepared in a two-stage emulsion polymerization process. The polymerization method is non-trivial and heterogeneous particles that contain the soft polymer infused into the hard polymer, rather than a true core-shell structure, may result (Journal of Applied Polymer Science, Vol. 39, page 2121, 1990). Aqueous coating compositions comprising core-shell latex polymer particles and use of, such coalescing acid-free compositions as ferrotyping resistant layers in photographic elements are disclosed in Upson and Kestner U.S. Pat. No. 4,497,917 issued Feb. 5, 1985. The polymers are described as having a core with a Tg of greater than 70° C. and a shell with a Tg from 25° to 60° C.

U.S. Pat. No. 5,447,832 describes a coalesced layer comprising film-forming colloidal polymer particles and non-film forming colloidal polymer particles for use in imaging elements. Those layers are coated from an aqueous medium and contain polymer particles of both high and low glass transition temperatures. Typically, the film forming colloidal polymer particles consist of low Tg polymers, and are present in the coated layers from 20 to 70 percent by weight.

U.S. Pat. No. 3,895,949 describes a photosensitive element having a layer of photosensitive material that is overcoated with a protective layer containing a copolymer obtained by reaction between about 10 to 70 percent by weight of an unsaturated carboxylic acid and at least one ethylenically unsaturated compound comprising up to 40 percent by weight of a hard component such as styrene or methyl methacrylate and about 50 to 30 percent by weight of a soft component such as ethyl acrylate, or butyl acrylate. Polymer particles that have such compositions are of low Tg, and therefore can coalesce and form a transparent film very easily under normal drying conditions used for manufacturing photographic elements.

U.S. Pat. Nos. 5,166,254 and 5,129,916 describe a water-based coating composition containing mixtures of an acrylic latex and an acrylic hydrosol. The acrylic latex contains 1 to 15% of methylol (meth) acrylamide, 0.5 to 10% carboxylic acid containing monomer, and 0.5 to 10% hydroxyl containing monomer, and has a Tg of from −40 to 40 (C and a molecular weight of from 500,000 to 3,000,000. U.S. Pat. Nos. 5,314,945 and 4,954,559 describe a water-based coating composition containing an acrylic latex and a polyurethane. The acrylic latex contains 1 to 10% of methylol (meth)acrylamide, 0.5 to 10% carboxylic acid containing monomer, and 0.5 to 10% hydroxyl containing monomer, and has a Tg of from −40° to 40° C. and a molecular weight of from 500,000 to 3,000,000. U.S. Pat. No. 5,204,404 describes a water-based coating composition containing a mixture of a dispersed acrylic silane polymer and a polyurethane. The acrylic silane polymer contains 1 to 10% of silane containing acrylates, 0.1 to 10% of carboxylic acid containing monomer, and 2 to 10% of hydroxyl containing monomer. The polymer has a Tg of from −40° to 25° C. and a molecular weight of from 500,000 to 3,000,000.

In recent years, the conditions under which imaging elements are manufactured and utilized have become even more severe. This is either because applications for imaging elements have been extended to more severe environments or conditions, for example, higher temperatures must be withstood during manufacturing, storage, or use, or because manufacturing and processing speeds have been increased for greater productivity. Under these conditions, the above mentioned methods to obtain aqueous coating compositions free of organic solvents become deficient with regard to simultaneously satisfying all of the physical, chemical, and manufacturing requirements for an aqueous coating for imaging applications. For example, the image elements are more severely scratched during high speed finishing processes. A foremost objective of the present invention is therefore to provide an aqueous coating composition which is essentially free of organic solvent, has excellent film forming characteristics under drying conditions used for imaging support manufacturing processes, and forms a dried layer with excellent resistance to physical scratch and abrasion, and to sticking and ferrotyping.

SUMMARY OF THE INVENTION

The present invention provides a photographic element comprising a polyolefin resin coated paper base, at least one light sensitive layer, and a backing layer formed by coating and subsequent drying of an aqueous coating composition having dispersed therein colloidal inorganic .oxide particles, an antistatic agent and a film forming binder comprising a carboxylic acid containing vinyl polymer or copolymer having a glass transition temperature of greater than 25° C. and an acid number of from 30 to 260 wherein the carboxylic acid containing vinyl polymer or copolymer is reacted with ammonia or amine so that the coating composition has a pH of from 7 to 10.

DESCRIPTION OF PREFERRED EMBODIMENTS

Coating compositions for forming the layers in accordance with the present invention comprise a continuous aqueous phase having therein a film forming binder, wherein the binder comprises a carboxylic acid containing vinyl polymer or copolymer having a glass transition temperature of greater than 25° C. and an acid number of from 30 to 260, preferably from 30 to 150. Acid number is in general determined by titration and is defined as the number of milligrams of KOH required to neutralize 1 gram of the polymer. The carboxylic acid groups of the polymer or copolymer are reacted with ammonia or amine to provide a pH of the composition of about 7 to 10. The glass transition temperature of the polymer is measured before neutralization of its carboxylic acid group with ammonia or amine. Preferably, the vinyl polymer has a glass transition temperature of greater than 25° C. If the glass transition temperature of the polymer is low, the coated layer is too soft and tacky. If the acid number is too small, coalescence of the film is not adequately enhanced by neutralization. If the acid number of the polymer is larger than 260, the resultant aqueous coating has a high viscosity, and gives a dried layer having poor water resistance. Other additional compounds may be added to the coating composition, depending on the functions of the particular layer, including surfactants, emulsifiers, coating aids, matte particles, rheology modifiers, crosslinking agents, inorganic fillers such as metal oxide particles, pigments, magnetic particles, biocide, and the like. The coating composition may also include a small amount of organic solvent, preferably the concentration of organic solvent is less than 1 percent by weight of the total coating composition.

The vinyl polymers or copolymers useful for the present invention include those obtained by interpolymerizing one or more ethylenically unsaturated monomers containing carboxylic acid groups with other ethylenically unsaturated monomers including, for example, alkyl esters of acrylic or methacrylic acid such as methyl methacrylate, ethyl methacrylate, butyl methacrylate, ethyl acrylate, butyl acrylate, hexyl acrylate, n-octyl acrylate, lauryl methacrylate, 2-ethylhexyl methacrylate, nonyl acrylate, benzyl methacrylate, the hydroxyalkyl esters of the same acids such as 2-hydroxyethyl acrylate, 2-hydroxyethyl methacrylate, and 2 -hydroxypropyl methacrylate, the nitrile and amides of the same acids such as acrylonitrile, methacrylonitrile, and methacrylamide, vinyl acetate, vinyl propionate, vinylidene chloride, vinyl chloride, and vinyl aromatic compounds such as styrene, t-butyl styrene, α-methyl styrene and vinyl toluene, dialkyl maleates, dialkyl itaconates, dialkyl methylene-malonates, isoprene, and butadiene. Suitable ethylenically unsaturated monomers containing carboxylic acid groups include acrylic monomers such as acrylic acid, methacrylic acid, ethacrylic acid, itaconic acid, maleic acid, fumaric acid, monoalkyl itaconate including monomethyl itaconate, monoethyl itaconate, and monobutyl itaconate, monoalkyl maleate including monomethyl maleate, monoethyl maleate, and monobutyl maleate, citraconic acid, and styrenecarboxylic acid.

There is some latitude in choice of binder material, but preferred binders contain vinyl benzene monomers, which enhance backmark retention, as is well known in the art. It is believed that such binders perform best for backmark retention because they are more likely to swell in typical solvents, hemectants or vehicles used in the manufacture of organic solvent based inkjet inks or ribbons used in dot matrix printing. In so doing, they allow the dyes or pigments present in such marking materials to become better embedded in the binder material.

When the polymerization is carried out using a hydroxyl-containing monomer such as a $C_2$–$C_8$ hydroxyalkyl ester of acrylic or methacrylic acid, a vinyl polymer containing a hydroxyl group as well as a carboxyl group can be obtained.

The vinyl polymers according to the present invention may be prepared by conventional solution polymerization methods, bulk polymerization methods, emulsion polymerization methods, suspension polymerization methods, or dispersion polymerization methods. The polymerization process is initiated in general with free radical initiators. Free radicals of any sort may be used. Preferred initiators include persulfates (such as ammonium persulfate, potassium persulfate, etc.), peroxides (such as hydrogen peroxide, benzoyl peroxide, cumene hydroperoxide, tertiary butyl peroxide, etc.), azo compounds (such as azobiscyanovaleric acid, azoisobutyronitrile, etc.), and redox initiators (such as hydrogen peroxide-iron(II) salt, potassium persulfate-sodiumhydrogen sulfate, etc.). Common chain transfer agents or mixtures thereof known in the art, such as alkyl-mercaptans, can be used to control the polymer molecular weight.

When solution polymerization is employed, examples of suitable solvent medium include ketones such as methyl ethyl ketone, methyl butyl ketone, esters such as ethyl acetate, butyl acetate, ethers such as ethylene glycol monobutyl ether, and alcohols such as 2-propanol, 1-butanol. The resultant vinyl polymer can be redispersed in water by neutralizing with an amine or ammonia. The organic solvent is then removed by heating or distillation. In this regard, organic solvents which are compatible with water are preferred to be used as reaction medium during solution polymerization. Suitable examples of amines which can be used in the practice of the present invention include diethyl amine, triethyl amine, isopropyl amine, ethanolamine, diethanolamine, morpholine, and the like.

A preferred method of preparing the vinyl polymer of the present invention is by an emulsion polymerization process where ethylenically unsaturated monomers are mixed together with a water soluble initiator and a surfactant. The emulsion polymerization process is well-known in the art (see, for example, Padget, J. C. in *Journal of Coating Technology*, Vol 66, No. 839, pages 89–105, 1994; El Aasser, M. S. and Fitch, R. M. *Ed. Future Directions in Polymer Colloids, NATO ASI Series*, No 138, Martinus Nijhoff Publishers, 1987; Arshady, R. *Colloid a Polymer Science*, 1992, No 270, pages 717–732; Odian, G. *Principles of Polymerization*, 2nd Ed. Wiley(1981) ; and Sorenson, W. P. and Campbell, T. W. *Preparation Method of Polymer Chemistry*, 2nd Ed. Wiley (1968)). The polymerization process is initiated with free radical initiators. Free radicals of any sort can be used. Preferred initiators include those already described. Surfactants which can be used include, for example, a sulfate, a sulfonate, a cationic compound, an amphoteric compound, or a polymeric protective colloid. Specific examples are described in McCUTCHEON'S Volume 1: *Emulsifiers Detergents*, 1995, North American Edition.

The vinyl polymer particles made by emulsion polymerization are further treated with ammonia or amine to neutralize carboxylic acid groups and adjust the dispersion to pH values from 7 to 10.

Crosslinking comohomers can be used in the emulsion polymerization to lightly crosslink the polymer particles. It is preferred to keep the level of the crosslinking monomers low so as not to affect the polymer film forming characteristics. Preferred crosslinking comonomers are monomers which are polyfunctional with respect to the polymerization reaction, including esters of unsaturated monohydric alcohols with unsaturated monocarboxylic acids, such as allyl methacrylate, allyl acrylate, butenyl acrylate, undecenyl acrylate, undecenyl methacrylate, vinyl acrylate, and vinyl methacrylate, dienes such as butadiene and isoprene, esters of saturated glycols or diols with unsaturated monocarboxylic acids, such as ethylene glycol diacrylate, ethylene glycol dimethacrylate, triethylene glycol dimethacrylate, 1,4-butanediol dimethacrylate, 1,3-butanediol dimethacrylate, and polyfunctional aromatic compounds such as divinyl benzene.

Inorganic metal oxides particularly suitable for use in the present invention include boehmite ($\alpha$-$Al_2O_3 \cdot H_2$)), tin Oxide ($SnO_2$), titania, antimony oxide ($Sb_2O_5$) , zirconium oxide ($ZrO_2$) , cerium oxide, yttrium oxide, zirconium silicate ($ZrSiO_4$), silica, and alumina-coated silica as well as other inorganic metal oxides of Groups III and IV of the Periodic Table and mixtures thereof. Colloidal silica is preferred, most preferably aluminum modified colloidal silica. The particle size ranges from 1 to 500 nanometers, preferably from 1 to 50 nanometers.

The coating composition in accordance with the invention may also contain suitable crosslinking agents which can react with carboxylic acid groups or hydroxyl groups including epoxy compounds, polyfunctional aziridines, methoxyalkyl melamines, triazines, polyisocyanates, carbodiimides, and the like.

Matte particles well known in the art may also be used in the coating composition of the invention, such matting agents have been described in Research Disclosure No. 308119, published Dec. 1989, pages 1008 to 1009. When polymer matte particles are employed, the polymer may contain reactive functional groups capable of forming covalent bonds with the binder polymer by intermolecular crosslinking or by reaction with a crosslinking agent in order to promote improved adhesion of the matte particles to the coated layers. Suitable reactive functional groups include: hydroxyl, carboxyl, carbodiimide, epoxide, aziridine, vinyl sulfone, sulfinic acid, active methylene, amino, amide, allyl, and the like.

The coating composition of the present invention may also include lubricants or combinations of lubricants to reduce the sliding friction of the photographic elements in accordance with the invention. Typical lubricants include (1) silicone based materials disclosed, for example, in U.S. Pat. Nos. 3,489,567, 3,080,317, 3,042,522, 4,004,927, and 4,047,958, and in British Patent Nos. 955,061 and 1,143,118; (2) higher fatty acids and derivatives, higher alcohols and derivatives, metal salts of higher fatty acids, higher fatty acid esters, higher fatty acid amides, polyhydric alcohol esters of higher fatty acids, etc disclosed in U.S. Pat. Nos. 2,454,043, 2,732,305, 2,976,148, 3,206,311, 3,933,516, 2,588,765, 3,121,060, 3,502,473, 3,042,222, and 4,427,964, in British Patent Nos. 1,263,722, 1,198,387, 1,430,997, 1,466,304, 1,320,757, 1,320,565, and 1,320,756, and in German Patent Nos. 1,284,295 and 1,284,294; (3) liquid paraffin and paraffin or wax like materials such as carnauba wax, natural and synthetic waxes, petroleum waxes, mineral waxes and the like; (4) perfluoro- or fluoro- or fluorochloro-containing materials, which include poly (tetrafluoroethlyene), poly(trifluorochloroethylene), poly (vinylidene fluoride, poly(trifluorochloroethylene-co-vinyl chloride), poly(meth)acrylates or poly(meth)acrylamides containing perfluoroalkyl side groups, and the like. Lubricants useful in the present invention are described in further detail in Research Disclosure No. 08119, published Dec. 1989, page 1006.

The coating composition of the invention can be applied by any of a number of well-known techniques, such as dip coating, rod coating, blade coating, air knife coating, gravure coating and reverse roll coating, extrusion coating, slide coating, curtain coating, and the like. After coating, the layer is generally dried by simple evaporation, which may be accelerated by known techniques such as convection heating. Known coating and drying methods are described in further detail in Research Disclosure No. 308119, Published Dec. 1989, pages 1007 to 1008.

In a particularly preferred embodiment, the photographic paper includes an image-forming layer which is a radiation-sensitive silver halide emulsion layer. Such emulsion layers typically comprise a film-forming hydrophilic colloid. The most commonly used of these is gelatin and gelatin is a particularly preferred material for use in this invention. Useful gelatins include alkali-treated gelatin (cattle bone or hide gelatin), acid-treated gelatin (pigskin gelatin) and gelatin derivatives such as acetylated gelatin, phthalated Gelatin and the like. Other hydrophilic colloids that can be utilized alone or in combination with gelatin include dextran, Gum arabic, zein, casein, pectin, collagen derivatives, collodion, agar-agar, arrowroot, albumin, and the like. Still other useful hydrophilic colloids are water-soluble polyvinyl compounds such as polyvinyl alcohol, polyacrylamide, poly (vinylpyrrolidone), and the like.

The photographic elements of the present invention can be simple black-and-white or monochrome elements comprising a support bearing a layer of light-sensitive silver halide emulsion or they can be multilayer and/or multicolor elements.

Color photographic elements of this invention typically contain dye image-forming units sensitive to each of the three primary regions of the spectrum. Each unit can be comprised of a single silver halide emulsion layer or of multiple emulsion layers sensitive to a given region of the spectrum. The layers of the element, including the layers of the image-forming units, can be arranged in various orders as is well known in the art.

A preferred photographic element according to this invention comprises a photographic paper bearing at least one blue-sensitive silver halide emulsion layer having associated therewith a yellow image dye-providing material, at least one Green-sensitive silver halide emulsion layer having associated therewith a magenta image dye-providing material and at least one red-sensitive silver halide emulsion layer having associated therewith a cyan image dye-providing material.

In addition to emulsion layers, the photographic elements of the present invention can contain one or more auxiliary layers conventional in photographic elements, such as overcoat layers, spacer layers, filter layers, interlayers, antihalation layers, pH lowering layers (sometimes referred to as acid layers and neutralizing layers), timing layers, opaque reflecting layers, opaque light-absorbing layers and the like. Details regarding supports and other layers of the photographic elements of this invention are contained in Research Disclosure, Item 36544, September, 1994 and Research Disclosure, Item 37038, February 1995.

The light-sensitive silver halide emulsions employed in the photographic elements of this invention can include coarse, regular or fine grain silver halide crystals or mixtures thereof and can be comprised of such silver halides as silver chloride, silver bromide, silver bromoiodide, silver chlorobromide, silver chloroiodide, silver chlorobromoiodide, and mixtures thereof. The emulsions can be, for example, tabular grain light-sensitive silver halide emulsions. The emulsions can be negative-working or direct positive emulsions. They can form latent images predominantly on the surface of the silver halide grains or in the interior of the silver halide grains. They can be chemically and spectrally sensitized in accordance with usual practices. The emulsions typically will be gelatin emulsions although other hydrophilic colloids can be used in accordance with usual practice. Details regarding the silver halide emulsions are contained in Research Disclosure, Item 36544, September, 1994, and the references listed therein.

The photographic silver halide emulsions utilized in this invention can contain other addenda conventional in the photographic art. Useful addenda are described, for example, in Research Disclosure, Item 36544, September, 1994. Useful addenda include spectral sensitizing dyes, desensitizers, antiffogants, masking couplers, DIR couplers, DIR compounds, antistain agents, image dye stabilizers, absorbing materials such as filter dyes and UV absorbers, light-scattering materials, coating aids, plasticizers and lubricants, and the like.

Depending upon the dye-image-providing material employed in the photographic element, it can be incorporated in the silver halide emulsion layer or in a separate layer associated with the emulsion layer. The dye-image-providing material can be any of a number known in the art, such as dye-forming couplers, bleachable dyes, dye developers and redox dye-releasers, and the particular one employed will depend on the nature of the element, and the type of image desired.

Dye-image-providing materials employed with conventional color materials designed for processing with separate solutions are preferably dye-forming couplers; i.e., compounds which couple with oxidized developing agent to form a dye. Preferred couplers which form cyan dye images are phenols and naphthols. Preferred couplers which form magenta dye images are pyrazolones and pyrazolotriazoles. Preferred couplers which form yellow dye images are benzoylacetanilides and pivalylacetanilides.

While many types of conductive materials can be used in the present invention, the preferred conductive material includes a non-ionic surface active polymer having polymerized alkylene oxide monomers and an alkali metal salt, as described in U.S. Pat. No. 4,542,095.

In order to optimize other characteristics of a photographic paper backing material, such as conductivity, it may be preferable to vary the ratio of colloidal silica to polymeric binder, the fraction of the total composition occupied by the conductor, or the relative ratios of polyalkylene-oxide containing molecule/salt which comprise the conductor. At the same time, the level of polymeric binder must be kept sufficiently high such that dusting does not occur, and retention of printed information printed on such a layer by dot matrix, inkjet or thermal printing is adequately maintained through wet processing. An appropriate fraction of silica, based on silica+polymeric binder weight, ranges from 20% to 90%, butin the preferred embodiment is 40–80% colloidal silica, 20–60% neutralized polymeric binder. A typical range of conductor weight fraction (based on the entire dry solids of the formulation) ranges from 5% to 15%, but is preferably between 6% and 8%. Furthermore, the ratio of polyalkylene oxide/alkali metal salt based on the formulations above may range from 10/90 to 90/10, but the preferred ratio is 40/60.

While the examples below are coated by slot hopper from 2% solids, they may also be successfully coated by a variety of other methods known to those skilled in the art. Alternate coating methods may employ solids contents ranging up to approximately 25% (gravure coating) and the above coating compositions may include additives known in the art, such as surfactants, defoamers, thickeners or leveling agents as required for the coating method chosen.

The present invention will now be described in detail with reference to examples; however, the present invention should not be limited to these examples.

The examples demonstrate the benefits of the aqueous coating compositions of the present invention, and in particular show that the coating compositions of the present invention have excellent film-forming characteristics under drying conditions typically used in the photographic support manufacturing process. The coated layer exhibits superior physical properties including exceptional toughness necessary for providing resistance to scratches and abrasion, and the resulting dusting and trackoff associated with such behavior.

EXAMPLES

In order to simulate a situation such as that encountered during the abrasion of a paper backing, a continuous loop abrasion tester was designed. A loop (152 cm) of paper is run for 3500 cycles at 250 rpm in a controlled atmosphere of 21° C., 80% relative humidity. The paper loop backing contacts three hard plastic rollers, one soft rubber roller, and a stationary hard plastic shoe during each revolution. Any buildup or dusting on the rollers or shoe is noted. The data from such a test accurately predicts dusting or buildup during sensitizing, processing, and printing operations.

The following examples demonstrate the superior abrasion resistance of photographic paper backings formed from coating compositions of this invention.

The polymers used in the following coating examples were prepared using standard emulsion polymerization techniques, and the emulsions so prepared were neutralized to a pH of 7 to 10 with ammonium hydroxide or triethyl amine.

EXAMPLES 1 & 2, COMPARATIVE EXAMPLES 3 & 4

The following coating compositions were slot hopper coated directly on polyethylene-resin coated paper after corona discharge treatment. The films were all coated from 2% solid solutions at a wet coverage of 16 cc/m$^2$, so that the dry coverage was approximately 0.32 g/m$^2$. The drying temperature setpoint was 82° C.

| Material | 1 | 2 | 3 | 4 |
|---|---|---|---|---|
| Polymer A (12.8%) | 7.8 | — | — | — |
| Polymer B (13.3%) | — | 7.5 | — | — |
| Polymer C (20.5%) | — | — | 4.9 | — |
| Polymer D (20%) | — | — | — | 5.0 |
| Ludox AM (30% solids) | 2.85 | 2.85 | 2.85 | 2.85 |
| Carbowax 3350 | 0.06 | 0.06 | 0.06 | 0.06 |
| $LiNO_3$ | 0.09 | 0.09 | 0.09 | 0.09 |
| Water | 89.2 | 89.5 | 92.1 | 92 |
| pH | 8.5 | 8.5 | 5.0 | 4.5 |

Polymer A: Terpolymer of methyl methacrylate/n-butyl acrylate/methacrylic acid (65/25/10), adjusted to a pH of 9.4 with triethylamine. Tg=73° C.

Polymer B: Copolymer of methyl methacrylate/acrylic acid (90/10), adjusted to a pH of 9.3 with triethylamine. Tg>100° C.

Polymer C: Same composition as polymer A, without triethylamine neutralization

Polymer D: Same as Polymer B, without triethylamine neutralization.

Ludox AM: Colloidal silica stabilized with sodium aluminate (DuPont Specialty Chemicals)

Carbowax 3350: Polyethylene glycol, average molecular weight 3350 (Union Carbide Industrial Chemicals Division)

Each dried coating was evaluated for abrasion resistance using the continuous loop paper backing abrasion tester described above. The results are summarized below.

+: No dust or buildup visible
o: Dust barely visible
v: Some dust or buildup
x: Heavy dust or buildup

| Example | Hard rollers (dust) | Soft roller (dust) | Stationary shoe (solid buildup) |
|---|---|---|---|
| 1 | + | o | + |
| 2 | + | o | + |
| Comp 3 | v | x | + |
| Comp 4 | + | v | + |

It is clear from the above examples that the neutralized versions of the polymeric binders demonstrate superior abrasion resistance.

EXAMPLES 5 & COMPARATIVE EXAMPLE 6

The following compositions were coated and dried using conditions similar to those listed for Examples 1–4:

| Material | 5 | 6 |
|---|---|---|
| Polymer E (49%) | 1.9 | — |
| Polymer F (30%) | — | 3.3 |
| Ludox AM | 3.1 | 2.8 |
| Carbowax 3350 | 0.06 | 0.09 |
| $LiNO_3$ | 0.09 | 0.06 |
| Water | 94.9 | 93.7 |

Polymer E: Intimate blend of copolymers with monomers chosen from styrene/α-methyl styrene/2-ethyl hexyl acrylate/ammonium acrylate (total ratio 63/10/20/7). pH 8.5, Tg 33° C.

Polymer F: Terpolymer of styrene/n-butyl methacrylate/2-sulfoethyl methacrylate ($Na^+$), 30/60/10. pH 6.5, Tg 46° C.

Each dried coating was evaluated for abrasion resistance using the continuous loop paper backing abrasion tester described above. The results are summarized below.

+: No dust or buildup visible o: Dust barely visible v: Some dust or buildup x: Heavy dust or buildup

| Example | Hard rollers (dust) | Soft roller (dust) | Stationary shoe (solid buildup) |
|---|---|---|---|
| 5 | + | o | + |
| Comparative 6 | o | v | x |

These examples show the superior abrasion resistance of photographic paper backings when polymers neutralized to a pH of 7 to 10 are used as film-forming binders. The same or roughly equivalent un-neutralized polymers used in similar formulations show unacceptable abrasion resistance under conditions typically encountered by photographic paper backings.

While there has been shown and described what are at present considered the preferred embodiments of the invention, it will be obvious to those skilled in the art that various attractions and modifications may be made therein without departing from the scope of the invention as defined by the claims. All such modifications are intended to be included in the present invention.

What is claimed:

1. A photographic element comprising:

a polyolefin resin coated paper base;

at least one light sensitive layer;

a backing layer formed by coating and subsequent drying of an aqueous coating composition having dispersed therein colloidal inorganic oxide particles, an antistatic agent and a film forming binder comprising a carboxylic acid containing vinyl polymer having a glass transition temperature of greater than 25° C. and an acid number of from 30 to 260 wherein the carboxylic acid containing vinyl polymer is reacted with ammonia or amine so that the coating composition has a pH of from 7 to 10.

2. The photographic element according to claim 1 wherein the carboxylic acid containing polymer is obtained by interpolymerizing one or more ethylenically unsaturated monomers containing carboxylic acid groups and other ethylenically unsaturated monomers.

3. The photographic element of claim 2 wherein the one or more ethylenically unsaturated monomers containing carboxylic acid groups are selected from the group consisting of acrylic monomers, monoalkyl itaconates, monoalkyl maleates, citraconic acid and styrene carboxylic acids.

4. The photographic element of claim 2 wherein the other ethylenically unsaturated monomers are selected from group consisting of alkyl esters of acrylic acid, alkyl esters of methacrylic acid, hydroxyalkyl esters of acrylic acid, hydroxyalkyl esters of methacrylic acid, nitriles of acrylic acid, nitriles of methacrylic acid, amides of acrylic acid, amides of methacrylic acid, vinyl aromatic compounds, dialkyl maleates, dialkyl itaconates, dialkyl methylene-malonates, isoprene and butadiene.

5. The photographic element of claim 1 wherein said coating composition further comprises a crosslinking agent.

6. The photographic element of claim 1 wherein said coating composition further comprises matte particles.

7. The photographic element of claim 1 wherein said coating composition further comprises lubricants.

8. The photographic element of claim 1 wherein the colloidal inorganic oxide particles comprise colloidal silica.

9. The photographic element of claim 8 wherein the coating composition has a ratio of colloidal silica to film forming binder from 1:5 to 9:1.

10. The photographic element of claim 1 wherein the antistatic agent comprises a polyalkylene oxide and an alkali metal salt.

11. A photographic paper comprising:

a polyolefin resin coated paper base;

a backing layer formed by coating and subsequent drying of an aqueous coating composition having dispersed therein colloidal inorganic oxide particles, an antistatic agent and a film forming binder comprising a carboxylic acid containing vinyl polymer having a glass transition temperature of greater than 25° C. and an acid number of from 30 to 260 wherein the carboxylic acid containing vinyl polymer is reacted with ammonia or amine so that the coating composition has a pH of from 7 to 10.

12. The photographic paper according claim 11 wherein the carboxylic acid containing polymer is obtained by interpolymerizing one or more ethylenically unsaturated monomers containing carboxylic acid groups and other ethylenically unsaturated monomers.

13. The photographic paper of claim 12 wherein the one or more ethylenically unsaturated monomers containing carboxylic acid groups are selected from the group consisting of acrylic monomers, monoalkyl itaconates, monoalkyl maleates, citraconic acid and styrene carboxylic acids.

14. The photographic paper of claim 12 wherein the other ethylenically unsaturated monomers are selected from group consisting of alkyl esters of acrylic acid, alkyl esters of methacrylic acid, hydroxyalkyl esters of acrylic acid, hydroxyalkyl esters of methacrylic acid, nitriles of acrylic acid, nitriles of methacrylic acid, amides of acrylic acid, amides of methacrylic acid, vinyl aromatic compounds, dialkyl maleates, dialkyl itaconates, dialkyl methylene-malonates, isoprene and butadiene.

15. The photographic paper of claim 11 wherein said composition further comprises a crosslinking agent.

16. The photographic paper of claim 11 wherein said coating composition further comprises matte particles.

17. The photographic paper of claim 11 wherein said coating composition further comprises lubricants.

18. The photographic element of claim 11 wherein the colloidal inorganic oxide particles comprise colloidal silica.

19. The photographic paper of claim 18 wherein the coating composition has a ratio colloidal silica to film forming binder of from 1:5 to 9:1.

20. The photographic paper of claim 11 wherein the antistatic agent comprises a polyalkylene oxide and an alkali metal salt.

* * * * *